No. 12,687. REISSUED AUG. 27, 1907.
W. HOCHFELDT.
COMBINATION RELIEF AND BACK PRESSURE VALVE.
APPLICATION FILED MAY 31, 1907.
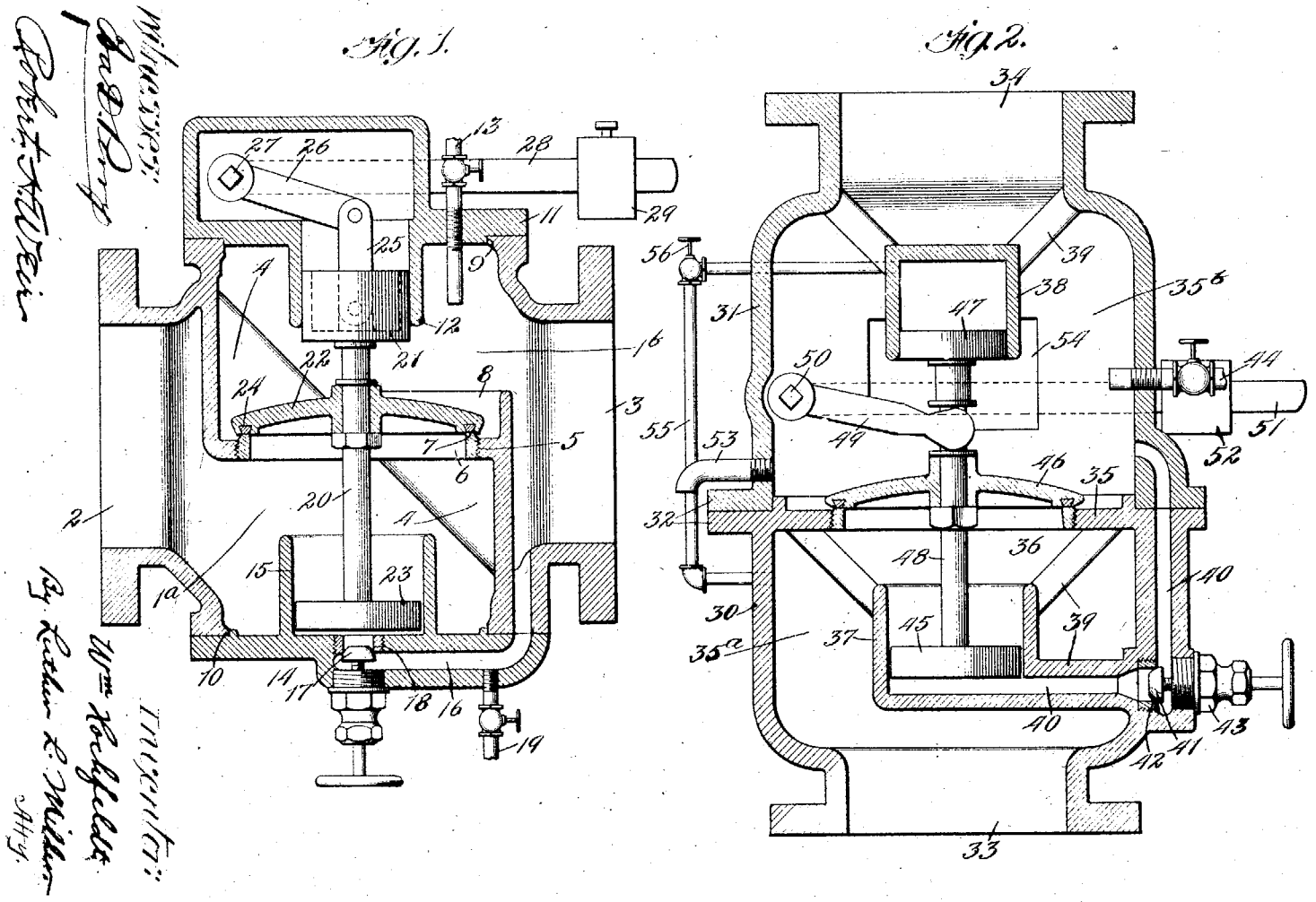
Witnesses:
Ira D. Perry
Robert A. Weir
Inventor:
Wm Hochfeldt
By Luther L. Millen
Att'y.

UNITED STATES PATENT OFFICE.

WILLIAM HOCHFELDT, OF CHICAGO, ILLINOIS, ASSIGNOR OF ONE-HALF TO GEORGE F. HUGHSON, OF CHICAGO, ILLINOIS.

COMBINATION RELIEF AND BACK-PRESSURE VALVE.

No. 12,687. Specification of Reissued Letters Patent. Reissued Aug. 27, 1907.

Original No. 793,788, dated July 4, 1905, Serial No. 238,550. Application for reissue filed May 31, 1907. Serial No. 376,739.

*To all whom it may concern:*

Be it known that I, WILLIAM HOCHFELDT, a citizen of the United States, residing at Chicago, in the county of Cook and State of Illinois, have invented certain new and useful Improvements in a Combination Relief and Back-Pressure Valve, of which the following is a specification.

The object of my invention is the production of an improved valve which with slight change may be used as a relief or back-pressure valve either for condensing or for non-condensing engines.

In the accompanying drawings, Figure 1 is a vertical central section taken through a horizontal valve embodying the features of my invention. Fig. 2 is a similar view of a vertical valve embodying my invention.

Referring to Fig. 1, the valve-casing 1 has the usual inlet 2 and outlet 3 and a partition 4 extending across the interior of said casing, said partition providing a vacuum chamber $1^a$ and an atmospheric chamber $1^b$. In an opening 5 in said partition is secured in any suitable manner, as by means of a screw-thread connection, a ring 6, providing a valve-seat 7. A rim or flange 8, extending partly around said valve-seat, is adapted, in conjunction with the vertical portion of the partition 4, to retain a quantity of water around the valve, to be hereinafter described, for forming a water seal. In the upper and lower sides of the valve-casing 1 are formed openings 9 and 10. The opening 9 is closed by a top cap 11, secured to the casing in any suitable manner, said top cap comprising a dash-pot cylinder 12. A pipe 13, extending through said top cap to a point above the valve-seat 7, provides means for admitting water to form a water seal. The opening 10 in the lower side of the valve-casing 1 is closed by a bottom plate 14, suitably secured to the casing. Upon the upper side of the bottom plate is formed a cylinder 15, alined with the cylinder 12 and the valve-seat 7. A port 16 formed in the bottom plate 14 and the valve-casing 1 connects the cylinder 15 with the atmosphere. Communication between said cylinder and the atmosphere is controlled by a valve 17, lying within a suitable stuffing-box and arranged to be seated upon a valve-seat 18 in said port. A drip-pipe 19 carries off the excess of water from the water seal, which otherwise might find its way into the cylinder 15. Upon a valve-stem 20 is rigidly secured in any convenient manner a piston 21 for the cylinder 12, a valve 22 for the valve seat 7, and a piston 23 for the cylinder 15, said piston 23 fitting its cylinder loosely in order to permit fluid to leak past said piston. A soft-metal facing-ring 24 is provided for the valve 22 to reduce wear upon the valve-seat 7. The upper end of the valve-stem 20 is connected, by means of a link 25, with an arm 26, fixed upon a shaft 27, which shaft is journaled in the side walls of the top cap 11 and carries at one of its ends outside said top cap a weight-arm 28, upon which a weight 29 may be adjustably secured.

When the valve hereinbefore described is to be used in a non-condensing system, the valve 17 is opened. The pressure in the inlet side of the valve-casing tends to lift the valve 22 from its seat 7. Such opening movement is resisted by the weighted arm 28, the steam-pressure upon the upper side of the piston 23, and the piston 21 in the dash-port cylinder 12. If the operator from an excess of caution or for other reasons should place upon the arm 28 weights which were barely sufficient to maintain the desired back pressure, the frequent slight variations of pressure in the supply-main are likely to cause chattering of the valve. Such underweighting may be corrected by partially closing the valve 17 in order to increase the pressure upon the under side of the piston 23, and thus hold the valve 22 slightly open all the time.

If the valve is to be used in a condensing system, the valve 17 is closed and the weights removed from the arm 28. The cylinders 12 and 15, with their pistons, act as dash-pots to check the movements of the valve 15. In practice condensation collects in the cylinder 15, and when the piston 23 is raised in the opening movement of the valve-closure 22 the condensation flows into the space beneath said piston, where its presence retards the closing of the closure 22, thus preventing chattering.

The vertical pattern of the valve, as shown in Fig. 2, is substantially like the horizontal form. The valve-casing in this instance is shown as formed in two parts 30 and 31, secured together by means of flanges 32 and provided, respectively, with an inlet-opening 33 and an outlet-opening 34. A partition 35 extending across the top of the casing-section 30 provides a vacuum chamber $35^a$ and an atmospheric chamber $35^b$ within the valve casing, said partition having an opening therein for receiving the valve-seat ring 36. Cylinders 37 and 38 are supported within the valve-casing by means of arms 39. The cylinder 37 is connected with the atmosphere by means of a duct 40, formed partly in the valve-casing and partly in one of the arms 39. 41 is a valve for opening and closing communication between said cylinder 37 and the atmosphere, said valve being arranged to be seated upon a valve-seat 41 and its stem extending through a stuffing-box 43. A pipe 44, extending into the casing, is provided for admitting water to form a water seal. A piston 45 for the cylinder 37, a valve 46 for the valve-seat 36, and a piston 47 for the cylinder 38 are rigidly secured upon a valve-stem 48. This piston fits its cylinder loosely, like the piston 23 in the horizontal valve. An arm 49, fixed upon a shaft 50, rotatably mounted in the opposite walls of the valve-casing section 31, has a sliding connection with said valve-stem. Upon one end of the shaft 50, outside of the valve-casing is fixed a weight-lever 51, upon which a weight 52 may be adjustably mounted. A drip-pipe 53 prevents the accumulation of an excessive amount of water above the valve 46. 54 is a hand-hole in the side of the valve-casing, arranged to be closed in any suitable manner. The operation of the form of valve just described is the same as that of the horizontal valve shown in Fig. 1.

When it is desired to maintain high back pressure, means may be provided for admitting steam-pressure to the upper side of the piston 21 47 to assist in holding the valve 22 46 closed. The connection between the cylinder 12 38 and the inlet side of the valve-casing may be established through a passage in the walls of the casing, by means of an opening extending longitudinally through the valve-stem 20 48, or, as shown in Fig. 2, by means of a pipe 55, controlled by a valve 56.

I desire to have it understood that I do not limit myself to the precise details shown herein, as many changes may be made by those skilled in the art without departing from the spirit and scope of my invention.

I claim as my invention:

1. In a valve, in combination, a casing having an inlet and an outlet and a vacuum-chamber, a valve arranged in said casing to control the opening of said chamber to the atmosphere, a piston-rod connected to said valve, and arranged to move in the direction of movement of the valve, said casing having a cylinder communicating with the outer air, and a piston arranged in said cylinder and connected to said rod, whereby the movements of said valve are cushioned.

2. In a valve, in combination, a casing having an inlet and an outlet opening, and a vacuum-chamber, and a cylinder, a valve arranged to control the communication between said vacuum-chamber and said outlet-opening, said cylinder communicating with the outer air, and means arranged in said cylinder and connected to said valve through a rod arranged to move in the direction of movement thereof for cushioning the movements of the latter.

3. In a valve, in combination, a casing having an inlet-opening and an outlet-opening, a valve arranged within said casing, and adapted to be operated automatically, a cushioning piston, a piston-rod connected to said valve and arranged to move in the direction of movement thereof, a cylinder in which said piston operates, and means for controlling the flow of air into and out of said cylinder.

4. In a valve, in combination, a casing having an inlet and an outlet opening, and a vacuum-chamber, a valve arranged within said casing to control the communication between said vacuum-chamber and said outlet-opening, a cylinder, a cushioning piston arranged therein and connected to said valve, and means for controlling the supply and exhaust of air to and from said cylinder.

5. In a valve, in combination, a casing having an inlet and an outlet opening, and a vacuum-chamber, an annular ring aranged within said casing intermediate said outlet-opening and said vacuum chamber, and foming a valve-seat, a valve coöperating with said seat and having a stem; means for guiding said stem during the movements of said valve, a cylinder, a piston arranged therein and connected to said valve, and means for controlling the flow of air into and out of said cylinder, whereby the rate of movement of said valve may be varied.

6. In a valve, in combination, a casing having an inlet and an outlet opening, and a vacuum-chamber, an annular ring arranged within said casing intermediate said outlet-opening and said vacuum-chamber and forming a valve-seat, a valve coöperating therewith, a pivotally mounted weighted lever connected to said valve, a cylinder, a piston arranged therein and connected to said valve, and means for controlling the flow of air into and out of said cylinder.

7. In an automatic relief-valve, a casing having an inlet-opening and an outlet opening, and a vacuum-chamber, an annular ring arranged in said casing to form a valve-seat intermediate said vacuum-chamber and said outlet-opening, a valve having a packing ring arranged in the face thereof and coöperating with the valve-seat, a piston-rod connected to said valve, a pivotally-mounted weighted lever connected to said piston-rod, a cylinder, a piston operating therein and connected to said rod, and means for controlling the flow of air into and out of said cylinder.

8. In a valve, in combination, a valve-casing having an inlet and an outlet; a valve-seat within said valve-casing; two alined cylinders at opposite sides of said valve-casing; a valve stem; a closure on said stem for said valve-seat; a piston on said valve-stem for each of said cylinders, said pistons and cylinders being adapted to act as dash-pots for checking the movements of said closure; and means tending to hold said closure seated.

9. In a valve, in combination, a valve-casing having an inlet and an outlet; a valve-seat within said valve-casing; two alined cylinders at opposite sides of said valve-casing; a valve-stem; a closure on said stem for said valve-seat; a piston on said valve-stem for each of said cylinders, said piston and cylinders being adapted to act as dash-pots for checking the movements of said closure; an operating shaft; an arm on said shaft for moving said valve-stem; a weight-arm on said shaft; and a removable weight on said arm.

10. In a valve, in combination, a valve-casing having an inlet and an outlet; a valve-seat within said valve-casing; a cylinder; a valve-stem; a closure on said stem for said valve-seat; a piston in said valve-stem for said cylinder adapted to permit the passage of pressure past it, means of communication being provided between said cylinder and the atmosphere; and means for controlling said communication.

11. In a valve, in combination, a valve-casing having an inlet and an outlet; a partition in said casing having a valve-opening therein; a cylinder communicating with the inlet side of said partition; a valve-stem; a closure on said valve-stem for said valve-opening; a piston on said valve-stem for said cylinder adapted to permit the passage of pressure past it, means of communication being provided between said cylinder and the atmosphere; and means for controlling said communication.

12. In a valve, in combination, a valve-casing having an inlet and an outlet; a valve-seat within said valve-casing; a cylinder having an open upper end communicating with the inlet side of said casing, whereby condensation is permitted to collect in said cylinder; a valve-stem; a closure on said stem for said valve-seat; and a piston on said valve-stem fitting said cylinder loosely.

13. In a valve, in combination, a valve-casing having an inlet and an outlet; a valve-seat within said valve-casing; two alined cylinders at opposite sides of said valve-casing; a valve-stem; a closure on said stem for said valve-seat; a piston on said valve-stem for each of said cylinders, one of said pistons fitting its cylinder loosely; and means for placing the space in said last mentioned cylinder to the rear of its piston in communication with the atmosphere.

14. In a valve, in combination, a valve casing; a partition in said casing provided with a valve opening; a closure for said opening; and a member on said partition extending about said opening for retaining a quantity of water about said closure to form a water seal.

15. In a valve, in combination, a valve-casing; a partition in said casing provided with a valve opening; a closure for said opening; means for holding a quantity of water about said closure to form a water seal; means for supplying water to form such seal; and means for preventing the accumulation of an excessive quantity of water.

WILLIAM HOCHFELDT.

Witnesses:
C. PAUL PARKER,
GEORGE L. CHINDAHL.